United States Patent [19]
Haight

[11] Patent Number: 5,224,395
[45] Date of Patent: Jul. 6, 1993

[54] TRANSMISSION SHIFT LEVER NEUTRAL LOCK

[75] Inventor: Robert E. Haight, Waterloo, Iowa

[73] Assignee: Deere & Company, Moline, Ill.

[21] Appl. No.: 925,542

[22] Filed: Aug. 5, 1992

[51] Int. Cl.$^5$ .................... G05G 9/00; F16H 61/06
[52] U.S. Cl. ........................................ 74/475; 74/476
[58] Field of Search ................................ 74/475, 476

[56] References Cited

U.S. PATENT DOCUMENTS

| | | | |
|---|---|---|---|
| 3,793,901 | 2/1974 | Müller et al. | 74/476 X |
| 3,993,175 | 11/1976 | Beveridge | 192/3.57 |
| 4,007,276 | 3/1978 | Knox, Jr. | 74/475 |
| 4,060,157 | 11/1977 | Hillstrom | 74/476 X |
| 4,163,398 | 8/1979 | Johnston | 74/483 R |
| 4,228,879 | 10/1980 | Woodbury | 192/4 A |
| 4,282,769 | 8/1981 | Sandrock | 74/475 |
| 4,291,589 | 9/1981 | Highland | 74/526 |
| 4,326,432 | 4/1982 | Miller | 74/475 |
| 4,515,033 | 5/1985 | Carlo | 74/476 |
| 4,546,665 | 10/1985 | Bieber | 74/475 X |
| 4,625,842 | 12/1986 | King | 192/4 C |
| 4,633,728 | 1/1987 | May | 74/476 |
| 4,638,678 | 1/1987 | Gorman et al. | 74/476 |
| 4,671,378 | 6/1987 | Korrect et al. | 180/336 |
| 4,827,792 | 5/1989 | Uetake et al. | 74/475 X |
| 5,063,817 | 11/1991 | Bogert | 74/476 X |

FOREIGN PATENT DOCUMENTS

| | | | |
|---|---|---|---|
| 2366100 | 10/1978 | Fed. Rep. of Germany | 74/476 |
| 266945 | 3/1927 | United Kingdom | 74/476 |

*Primary Examiner*—Leslie A. Braun
*Assistant Examiner*—David E. Henn

[57] ABSTRACT

A shift lever assembly includes plate having a plurality of intersecting slots formed therein, including fore-and-aft extending directional gear slot and a transverse extending neutral slot. The neutral slot has a recess formed on one side thereof. A lever has a movable shaft received in and guided in the slots. A latch member is engagable with the shaft to releasably hold the shaft in the recess and prevent inadvertent movement of the shaft from the neutral slot into the directional gear slot. A shaft spring is biased to urge the shaft away from the directional gear slot. A latch spring is biased to urge the latch member towards the recess so that the shaft, latch member, the latch spring and recess cooperate to deter inadvertent movement of the shaft in a direction generally parallel to the neutral slot and out of the recess and out of the neutral slot. The latch member is pivotal away from the recess by the shaft when the shaft is moved away from the recess and in a direction generally transverse to the neutral slot, to thereby permit movement of the shaft in a direction generally parallel to the neutral slot and out of the recess and out of the neutral slot.

11 Claims, 4 Drawing Sheets

TRANSMISSION SHIFT LEVER NEUTRAL LOCK

BACKGROUND OF THE INVENTION

This invention relates to a transmission shift lever assembly for a vehicle transmission control system.

In an electro-hydraulically controlled power shift transmission or in a hydro-mechanically controlled transmission, the shift lever can be moved with low effort between gears or from neutral into a forward or reverse gear. If the operator leaves the shift lever in neutral while the engine is running, then an inadvertent movement of the shift lever could cause an accidental shift of the transmission into gear. A mechanism which would deter such accidental shifting is desired. A known power shift transmission includes a finger actuated collar to release the shift lever from neutral. Automobiles have used thumb-actuated buttons on shift levers to prevent the shift lever from being accidentally moved from park into reverse, for example. Such collars or buttons may be difficult to release if the operator is wearing gloves.

A transmission shifter neutral lock is shown in U.S. Pat. No. 4,282,769, issued 11 Aug. 1981 to Sandrock. However, in this system a locking arm must be manually rotated into and out of a locking position by means of a T-shaped handle. Another transmission shifter neutral lock is shown in U.S. Pat. No. 4,163,398, issued 7 Aug. 1979 to Johnston. However, in this system a pair of locking levers must be manually rotated into and out of a locking position by means of an actuating lever. It would be desirable to have a neutral locking mechanism which locks automatically and which can be easily unlocked by manipulation of the shift control lever.

Another transmission shifter neutral lock is shown in U.S. Pat. No. 4,671,378, issued 9 Jun. 1987 to Korrect et al. However, this mechanism requires a bulky mechanism including a shaft and a bracket having a slot with a "cut-out" which receives the transmission control lever. It would be desirable to have a neutral locking mechanism which is simple and compact.

SUMMARY OF THE INVENTION

An object of the present invention is to provide a transmission shift lever assembly with a neutral locking mechanism which deters inadvertent movement of the shift lever from a neutral position into a forward or reverse gear position.

Another object of the invention is to provide a such a neutral locking mechanism which can be easily operated by an operator wearing gloves.

Another object of the invention is to provide a such a neutral locking mechanism which is simple and compact.

These and other objects are achieved by the present invention wherein a shift lever assembly includes a plate having a plurality of intersecting slots formed therein, including a fore-and-aft extending directional gear slot and a transverse extending neutral slot. The neutral slot has a recess formed on one side thereof. A lever has a movable shaft received in and guided in the slots. A latch member is engagable with the shaft to releasably hold the shaft in the recess and prevent inadvertent movement of the shaft from the neutral slot into the directional gear slot. A shaft spring is biased to urge the shaft away from the directional gear slot. A latch spring is biased to urge the latch member towards the recess so that the shaft, latch member, the latch spring and recess cooperate to deter inadvertent movement of the shaft in a direction generally parallel to the neutral slot and out of the recess and out of the neutral slot. The latch member is pivotal away from the recess by the shaft when the shaft is moved away from the recess and in a direction generally transverse to the neutral slot, to thereby permit movement of the shaft in a direction generally parallel to the neutral slot and out of the recess and out of the neutral slot.

DETAILED DESCRIPTION

Figure 1:
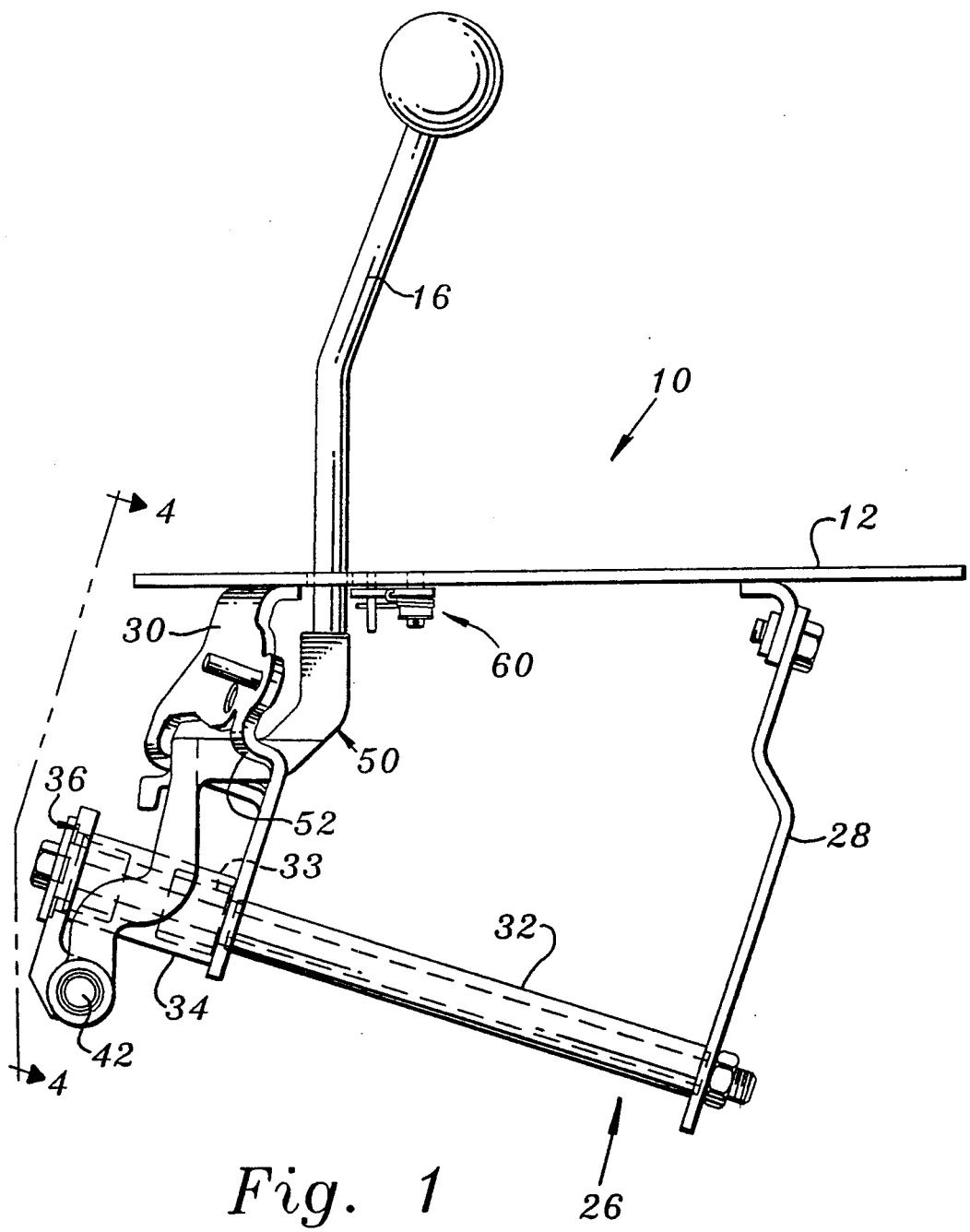
FIG. 1 is a elevation view of a transmission shift lever assembly according to the present invention.
Figure 3:
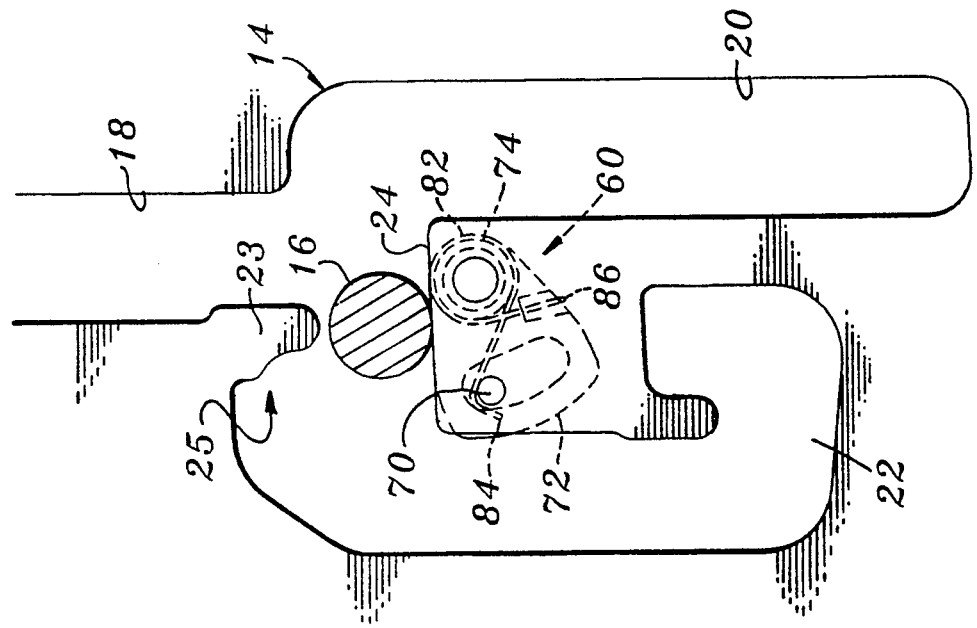
FIGS. 2 and 3 are top views showing a portion of the present invention in different operational states.
Figure 2:
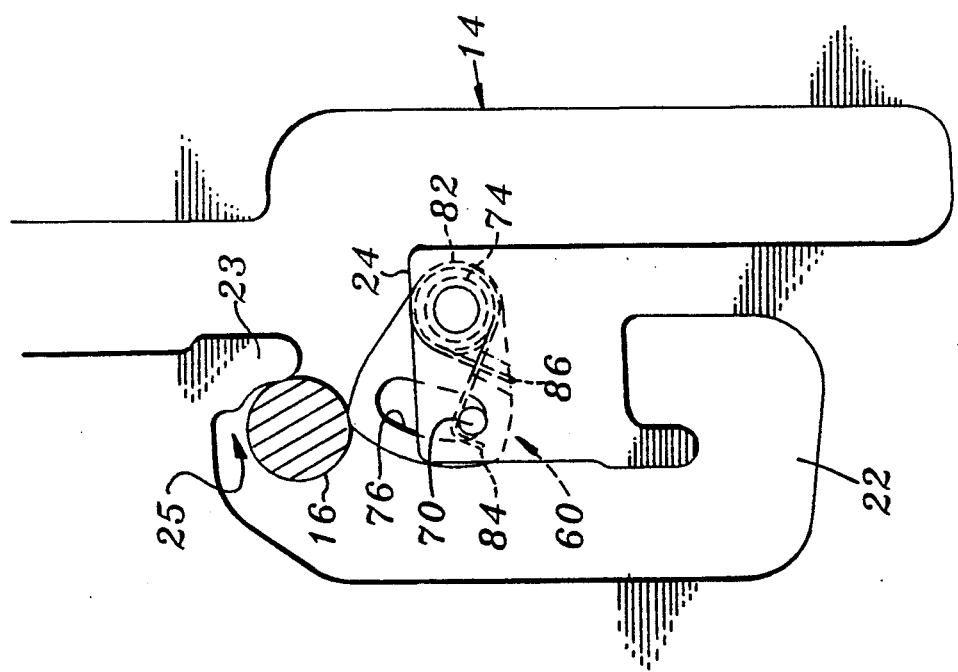

Referring to FIGS. 1, 2 and 3, a console, generally indicated as 10, is mounted in the operator's station of a conventional agricultural tractor (not shown) of the type employing a powershift transmission system (not shown). The console 10 is comprised of a housing having a top wall 12 and enclosing sidewalls (not shown). A slot 14 is formed in the top wall 12. A shift lever 16 extends generally perpendicular through the slot 14.

The slot 14 defines a fore-and-aft extending first or forward leg 18, a fore-and-aft extending second or reverse opposite leg 20, a third or park leg 22 and a transverse extending neutral leg 24. The top wall 12 forms a tab 23 which projects part way into the neutral slot 24 and forms a recess 25 on one side thereof. Shift lever 16 is selectively moved to leg 18 to effect a forward operation of the vehicle, increasing the forward speed as the shift lever 16 moves further up leg 18. In like manner, selectively placing the shift lever 16 in slot 20 effects a reverse operation of the vehicle at increased speeds upon the journey of shift lever 16 down slot 20. When the shift lever 16 is within slot 24, the vehicle is in a neutral operating mode.

Figure 4:
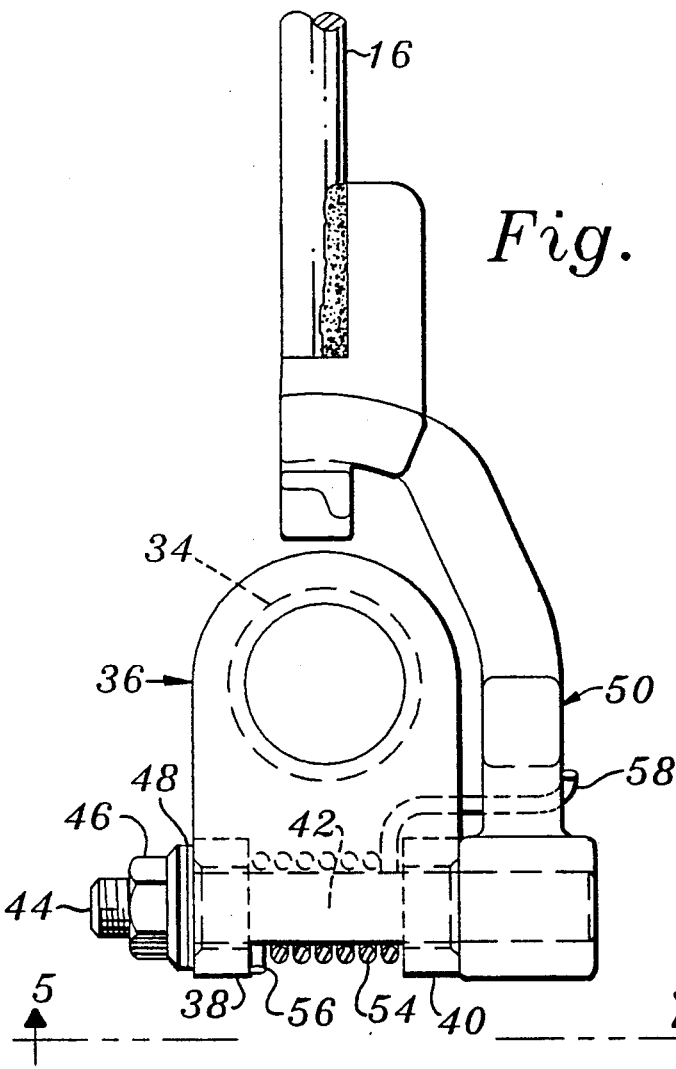
FIG. 4 is a view in the direction of arrows 4—4 of FIG. 1 with parts removed for clarity.
Figure 5:
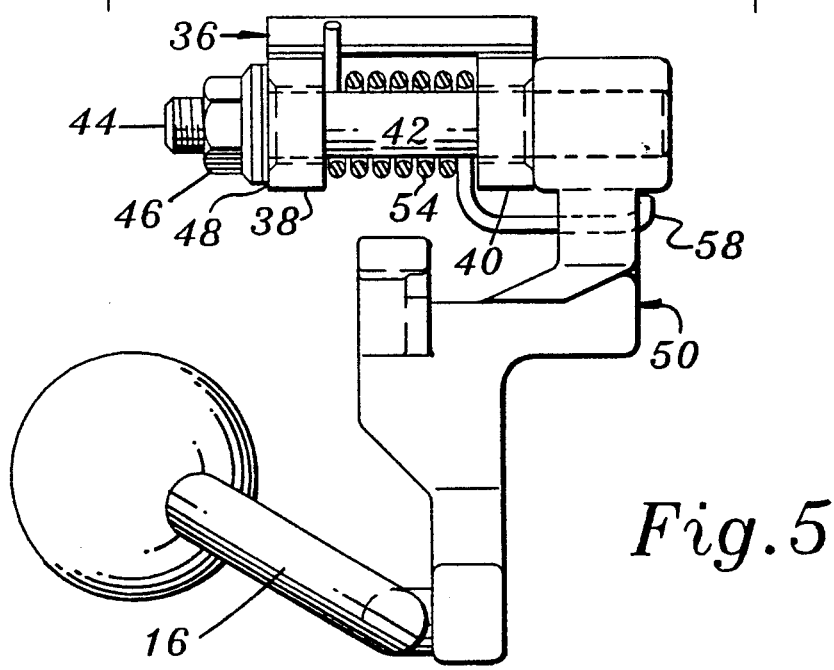
FIG. 5 is a view in the direction of arrows 5—5 of FIG. 4.
Figure 6:
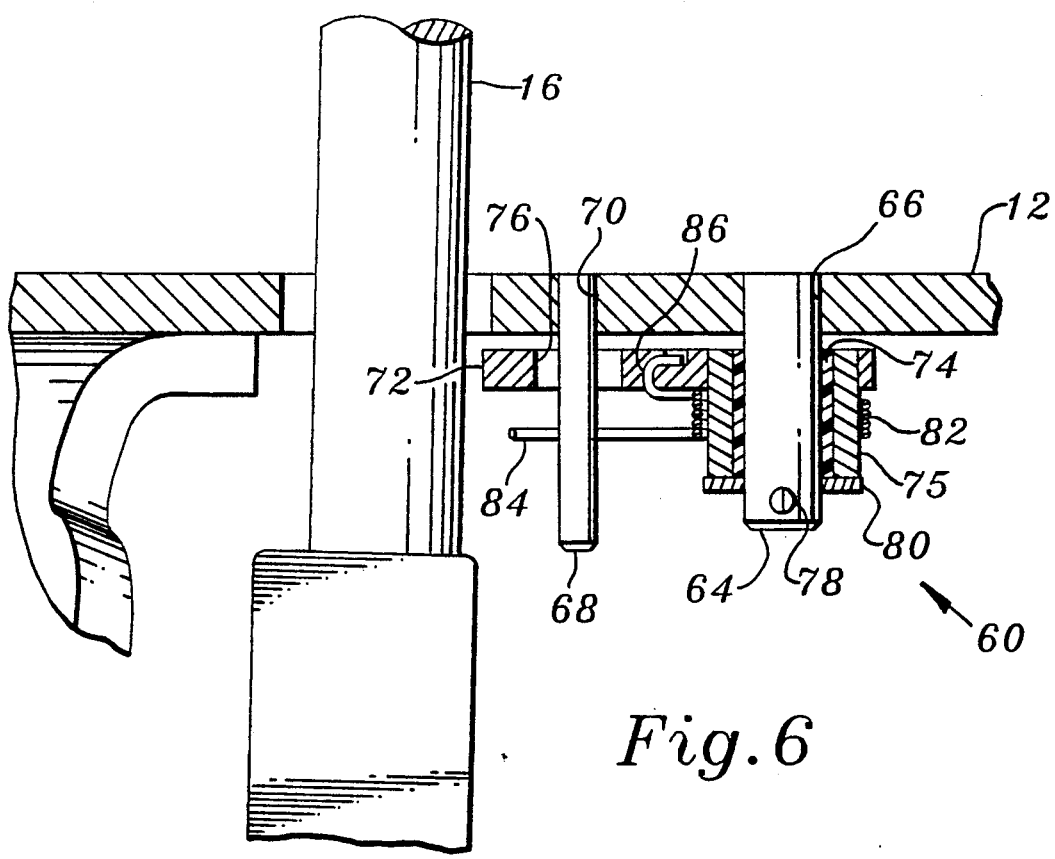
FIG. 6 an enlarged sectional view of the latch mechanism of the present invention.

The shift lever 16 is coupled to a powershift transmission (not shown) by a control linkage system 26. This linkage system 26 is only partially shown because the present invention is concerned only with the neutral interlock mechanism which will be described hereinafter. The operation of a vehicle powershift transmission (not shown), is controlled by the positioning of shift lever 16. Referring more particularly to FIGS. 1, 4 and 5, the control linkage 26 includes support brackets 28 and 30 which are fixed to top wall 12 by any conventional means such as welding. Shafts 32 and 33 are bolted to the brackets 28 and 30, and a spool 34 is rotatably supported on shaft 33. A bracket 36 is fixed to the end of spool 34. As best seen in FIG. 5 the bracket 36 has a pair of legs 38 and 40. The legs 38 and 40 rotatably receive a pin 42. The pin 42 has a threaded end 44 and is retained in the legs 38, 40 by a nut 46 and washer 48. The other end of pin 42 is fixed to one end of a lever member 50, the other end of which is attached to the shaft 16. As best seen in FIG. 1, the lever member 50 extends through a opening 52 in bracket 30. As best seen in FIG. 5, a coil spring 54 is mounted on the pin 42.

Spring 54 has one arm 56 which engages bracket 36 and a second arm 58 which engages lever member 50. Spring 54 is biased to urge shaft 16 counterclockwise about the axis of pin 42 (viewing FIG. 1) and to the left (viewing FIGS. 2 and 3).

As best seen in FIGS. 1, 2, 3 and 6, a latch mechanism 60 is mounted to the underside of the top wall 12 adjacent to neutral slot 24 and generally opposite recess 25. A pivot post 64 is press fitted into a bore 66 in the top wall 12 and a spring anchor post 68 (preferably a commercially available spring pin) is press fitted into a bore 70 in the top wall 12. A latch member 72 is formed by a flat plate with a generally triangular or tear-drop shape with a bore 74 extending through one apex. A cylindrical steel sleeve 75 which contains a bushing with a low friction plastic liner is press fitted into bore 74. A curved slot 76 is formed in the latch member 72 and is positioned adjacent the side of latch member 72 which is opposite bore 64. The end walls of slot 76 are engagable with post 68 to limit pivoting of latch member 72 towards and away from the recess 25 and the projection 23. The pivot post 64 is pivotally received in bushing 75 so that latch member 72 can freely pivot about the axis of post 64, and the latch member 72 is held onto the post 64 by cotter pin 78 and washer 80.

A coil spring 82 has a coil mounted around the bushing 75, one arm 84 hooked around post 68 and another end 86 received by a notch in a surface of the latch member 72. The spring 82 is biased to urge the latch member 72 clockwise about the axis of post 64, into the position shown in FIG. 2 wherein post 68 engages an end of slot 76 and limits further pivoting of the latch member 72.

If the shaft 16 is to the left of the latch member 72 and is then moved to the right, the shaft 16 will engage the latch member 72 and the latch member 72 will cause the shaft 16 to move to the position shown in FIG. 2. In this position, the shaft 16 is releasably held in the recess 25 and against projection 23. In this position, if the operator inadvertently bumps against the shaft 16 in a manner which would tend to move the shaft 16 to the right, out of the neutral slot 24 and towards the slots 18 and 20, the latch member 72 and the projection 23 cooperate to prevent such inadvertent movement of the shaft 16. In order to move the shaft 16 from the neutral slot 24 into the slots 18 or 20, the shaft 16 must first be moved downward viewing FIG. 2. This causes the latch member 72 to pivot about post 64 and away from recess 25. This allows shaft 16 to be moved beyond the end of projection 23 and into the position shown in FIG. 3. From this position, the shaft 16 can then be easily moved into one of slots 18 or 20.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A shift lever assembly having a plate with a directional gear slot intersecting with a neutral slot, a shift control lever having a movable shaft received in and guided in the slots, and a latch mechanism for releasably holding the shaft in the neutral slot, characterized by:
   a tab projecting part way into the neutral slot from one side thereof;
   a latch member pivotally mounted to the plate adjacent to a side of the neutral slot opposite from the tab; and
   a latch spring biased to urge the latch member towards the tab to a latching position wherein the latch member engages the shaft and the latch member and the tab cooperating to deter inadvertent movement of the shaft in a direction generally parallel to the neutral slot and past the tab and out of the neutral slot, the latch member being pivotal away from the tab by the shaft when the shaft is moved away from the tab and in a direction generally transverse to the neutral slot, to thereby permit movement of the shaft in a direction generally parallel to the neutral slot and past the tab and out of the neutral slot.

2. The invention of claim 1, wherein:
   a pivot pin is attached to the plate adjacent to the neutral slot; and
   the latch member has a generally triangular shape with a bore extending through one apex, the bore rotatably receiving the pivot pin.

3. The invention of claim 2, wherein:
   the latch spring has a coil which receives the pivot pin and an arm which engages the latch member.

4. The invention of claim 2, wherein:
   the latch member includes a hollow cylindrical bushing projecting from said one apex, the bushing rotatably receiving the pivot pin.

5. The invention of claim 4, wherein:
   the latch spring has a coil which is mounted on the bushing.

6. The invention of claim 2, wherein:
   a stop pin is attached to the plate adjacent to the neutral slot spaced apart from the pivot pin; and
   the latch member has a limit slot therein which receives the stop pin, the limit slot having end walls which are engagable with the stop pin to limit the pivoting movement of the latch member.

7. The invention of claim 6, wherein: the latch spring has one arm which engages the stop pin and a second arm which engages the latch member.

8. The invention of claim 1, further comprising:
   a shaft spring biased to urge the shaft away from the directional gear slot.

9. The invention of claim 1, wherein:
   a stop engages the latch member and limits pivoting thereof towards the recess and holds the latch member with one of its apexes between the sides of the neutral slot.

10. The invention of claim 9, characterized by:
    a limit slot is formed in the latch member, the stop comprising a post which is fixed to the plate and which is received in the limit slot and is engagable with end walls of the limit slot.

11. The invention of claim 10, wherein: the latch spring has an arm which is coupled to the post.

* * * * *